United States Patent Office 3,839,346
Patented Oct. 1, 1974

3,839,346
N-SUBSTITUTED PYRIDONE AND GENERAL METHOD FOR PREPARING PYRIDONES
Shreekrishna Manmohan Gadekar, Trenton, N.J., assignor to Affiliated Medical Research Inc., Princeton, N.J.
No Drawing. Filed Dec. 18, 1972, Ser. No. 315,836
Int. Cl. C07d 31/32
U.S. Cl. 260—297 Z    5 Claims

ABSTRACT OF THE DISCLOSURE

Novel analgesic compositions containing as the active ingredient the compound, 5-methyl-1-phenyl-2-(1-H) pyridone are described. In addition, a general method for the synthesis of aromatic group N-substituted 2(1-H) pyridones is described wherein a 2-(1H) pyridone, which may be substituted, is reacted with an appropriate halo-aromatic compound in the presence of an alkali metal carbonate and copper powder. The appropriate aromatic N-substituted pyridone is obtained in excellent yield.

The present invention relates to novel analgesic compositions containing as active ingredient 5-methyl-1-phenyl-2 (1H) pyridone and a general method for preparing this and related compounds and more particularly it relates to a general method for the preparation of substituted-1-Aromatic N-2 (1H) pyridones.

Specifically, I have discovered excellent analgesic compositions containing as the active ingredient the compound 5-Methyl-1-Phenyl-2-(1-H) pyridone (AMR-69) having the formula

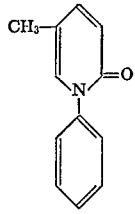

I

Further, I have also discovered a novel general method for making this and related pyridones having the formula

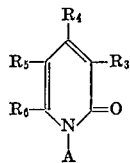

II

Wherein A is an aryl group or a heterocyclic group of an aromatic nature; $R_3$, $R_4$, $R_5$ and $R_6$ are individually each hydrogen, alkyl, aryl or substituted aryl, and which process is carried out without the use of alkali metal hydrides and in much better yield than previous methods which required the use of such dangerous intermediates.

BACKGROUND OF THE INVENTION

Certain substituted pyridones and particularly those wherein the N-substituents are phenylamine derivatives are known to possess analgesic qualities. Several of these are disclosed in British Pat. 1,238,959 and in U.S. Pats. 2,947,754 and 2,947,755. None of these compounds, during the intervening years, have exhibited sufficient potency and/or safety to provide marketable analgesic compositions.

These compounds have generally been prepared either by ring closure of the appropriate diol intermediates, (U.S. Pat. 2,947,754) which are expensive when available; the reaction of cyanoacetanilide with 2,4-diketones (Chem. Abstract 72, 308); by the catalytic dehydrogenation of the appropriate dihydro-2-pyridone (J. Org. Chem. 26, 2586) or by the reaction of an appropriate 2-(1H) pyridone alkali metal salt (which is prepared by reaction of the pyridone with an alkali metal hydride) with the appropriate halogenated aryl compound in over yields of about 15–25% (British Pat. 1,238,959, page 9) (U.S. Pat. 2,947,755).

As will be apparent to those skilled in the art, these processes are different, uneconomical and often result in poor yields after extended manipulation of expensive starting materials.

While 5-methyl-1-phenyl-2 (1H) pyridone has been used as an intermediate in synthesis, there is no report suggesting its use as a therapeutic agent and particularly there is no report for its having analgesic qualities.

THE INVENTION

I have discovered that 5-methyl-1-phenyl-2 (1H) pyridone (AMR-69) has excellent analgesic activity, marked anti-inflammatory activity and shows excellent anti-pyretic activity in test animals when compared with the standard analgesic drug possessing these activities (aminopyrine). Further as compared to this standard, the compound of the present invention, when formulated into dosage form for oral or intraperitoneal administration showed markedly lower toxicity in test animals.

Further, in the course of preparing the above compound for formulation into the therapeutic compositions of the invention, I have discovered a novel process for its synthesis starting from commercially available, comparatively inexpensive raw materials by a straight-forward simple procedure which yields the desired compound in purified form in higher yields then have heretofore been available. Further as I perfected this process, I have found that it is useful for the synthesis of an entire range of N-aromatic-substituted pyridones. These previously could only be achieved either from difficult starting materials or via derivatives which required the use of extremely caustic and dangerous reactants such as the alkali metal hydrides and which even with the use of such reactants afforded the desired compounds in comparatively poor yields.

The present invention in its compositional aspects is directed to affording pharmaceutical compositions wherein 5-methyl-1-phenyl-2(1H) pyridone (AMR-69) is formulated, together with a pharmaceutically acceptable solid carrier, diluent or coating; a liquid carrier, solvent, or diluent or a gaseous carrier to provide pharmaceutical compositions in forms suitable for therapeutic administration.

The solid carriers are useful in subdividing the material into pills, tablets, powders or cachets for immediate or sustained release or where desirable into suppositories or bougies. Solid diluents may include flavors or therapeutic adjuvants. The liquid carrier can provide flavorful vehicles for oral administration. In proper liquid form adjusted as to tonicity, the active compound may be prepared into solution or liquid suspension for injectable administration. The gaseous carriers or diluents are useful in preparing the active ingredient for aerosol administration where indicated.

In the above compositions the active material together with its solid diluent or carrier can be pressed into dosage forms such as pills or tablets or encapsulated for sustained release; or it can be buffered so as to dissolve in isotonic solutions for administration by injection. It can also be dispersed in suitable semi-solid carriers or liquid for topical administration for local or systemic effect.

While AMR-69 is an effective analgesic and can be utilized by itself in therapy, it may also be combined with other therapeutic agents to obtain the combined effects of AMR-69 with such agents. The typical agents with which it may be combined are other analgesics, sedatives, mild stimulates, anti-arrythmics, tranquilizers etc. The only pharmacological incompatibility would be with CNS stimulants which may amplify pain beyond the analgesic capabilities of AMR-69. As AMR-69 appears to exercise its effects by a different enzyme system than aspirin, it may advantageously be combined with aspirin in therapeutic compositions according to this invention to achieve the combined effects of these agents, neither of which generates phenylhydrazine derivatives during catabolism.

The standard pharmaceutically acceptable carriers normally used in such pharmaceutical formulations can be utilized in formulating the aforesaid compositions of this invention.

According to the process aspects of this invention a process is provided for the synthesis of pyridones of the formula

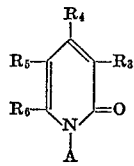
II wherein A is an aromatic group; $R_3$, $R_4$, $R_5$ and $R_6$ are individually each hydrogen, alkyl, aryl or substituted aryl; which comprises the steps of reacting a pyridone of the formula

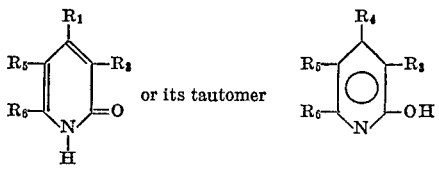
IV in which $R_3$, $R_4$, $R_5$ and $R_6$ are as set forth above, with a halogenated compound of the formula AX, wherein X is either chlorine, bromine or iodine, at temperatures ranging between the melting point and boiling point of said halogenated compound, in the presence of an alkali metal carbonate and finely divided metallic copper.

The term "aromatic group" as utilized in describing the A elements in this invention refers to aryl or aromatic groups as defined in *Karrer, Paul*, "Organic Chemistry," *1938*, Elsevier Publishers (English Edition), part II, page 339; and includes the "aromatic-like hetercyclic groups" as defined in the same text and reference at pgs. 691–693. Among such aryl groups are phenyl, 3-nitrophenyl; 4-methoxyphenyl; p-tolyl; 3′-trifluoromethylphenyl; 4′-chlorophenyl; 2′-naphthyl; 1′-naphthyl; etc. The preferred substituent among the aryl compounds is the phenyl group. This is the substituent in the compound which I have found to be most effective as an analgesic i.e. 5-methyl-1-phenyl-2(IH) pyridone (AMR 69).

Among the aromatic-like heterocyclic groups are those heterocyclic compounds listed by Karrer and described as having an aromatic nature, including 2-thienyl; 2-furyl; 5′-quinolyl, 4′-pyridyl, 3′-pyridyl, 2′-pyridyl, 2′-quinolyl, 4′-quinolyl, 2′-thiazolyl, 2′-imidazolyl.

$R_3$, $R_4$, $R_5$, and $R_6$ may individually each be hydrogen, alkyl groups, up to 6 carbon atoms; aryl or substituted aryl or even aromatic groups as defined above.

The reaction is preferably achieved in the liquid state but in the absence of solvent diluents and consequently should be performed at temperatures ranging between the melting point and the boiling point of the reactants. Since the halogenated compound having the formula AX is usually the lower melting component, its melting point fixes the lower temperature for the reaction. As the reaction proceeds a eutectic may form from the intersolution of the reactants or of the reaction products. If desired, the temperature may be adjusted accordingly. However, in the interest of maintaining the speed of the reaction, it is preferred to operate above this minimum temperature and the reaction may be conducted at temperatures up to the boiling point of the lowest boiling component of the reaction mixture. It is preferred not to conduct the reaction in a solvent but a solvent, inert to the reactants and to the reaction products, may be utilized.

I have found that conversion of the initial pyridone having formula III to its alkali metal salt by reaction of the pyridone with the alkali metal hydride as taught by the prior art is not necessary. Instead I avoid this conversion and conduct the reaction within the above described temperature range in the presence of an alkali metal carbonate and finely divided metallic copper.

As the reaction proceeds without the need for the alkali metal hydrides, previous precautions concerning absolute anhydrous conditions and inert gas atmospheres are not necessary. However, it is preferred to use the alkali metal carbonate in excess of the stoichiometrics amount needed to react with the halogen, in substantially anhydrous form as this provides the alkali metal carbonate in its most concentrated form. Among the useful alkali metal carbonates are potassium carbonate, cesium carbonate, sodium carbonate and lithium carbonate. Potassium carbonate is preferred.

The finely divided copper which is used for this reaction may be any copper powder in finely subdivided form. Because of the maleability of copper, grindings of copper are not fine enough and do not possess sufficient surface area to provide the preferred highly activated copper which promotes the reaction at the desired rate. The preferred form of finely divided copper to be utilized for the present reaction is the copper resulting from the precipitation of copper sulfate solutions ($CuSO_4$) by the addition thereto of zinc dust. Various techniques exist for the preparation of such highly activated coppers (of *Organic Synthesis, Vol. 2* (1943), pg. 446.

DETAILED DESCRIPTION AND EXAMPLES

Bio-assay results with 5-methyl-1-phenyl-2-(1H) pyridone (AMR-69)

Analgesic Activity

The end-point for analgesic testing in rats with the hind limb inflamed is based on the absence of a squeal in response to flexion of the inflamed ankle joint (method described by S. Margolin) (Proceedings of an International Symposium on Non-Steroidal Anti-Inflammatory Drugs, Excerpta Medica International Congress, Series No. 82, 1964). By this procedure, the oral $ED_{50}$ (median analgesic dose) for AMR–69 is 145±26. The comparison standard was aminopyrine, which has an oral $ED_{5\,0}$ of 150±26. AMR–69 by the oral route is as effective as aminopyrine as an analgesic. However, a more rapid onset of analgesic effect with AMR–69 as compared to aminopyrine was noted during the tests.

Anti-Inflammatory Activity

Anti-inflammatory activity was assayed by the method described by Margolin (ibid) utilizing albino rats. The anti-inflammatory bio-assay basis is the ability to reduce the edema (swelling) when an experimental inflammation is induced in the hind limb of the rats. The oral median effective dose ($ED_{50}$) in rats for AMR–69 is 200±46 mg./kg. The median effective dose for aminopyrine is 185±31 mg./kg. Here too a more rapid onset of the therapeutic effect was noted.

Anti-Pyretic Activity

Anti-pyretic activity testing is based upon the ability of the drug to suppress the experimentally-induced fever in albino rabbits (F. M. Berger et al. J. Pharmacology and Experimental Therapeutics, Vol. 127, No. 1, 1959 based upon the original presentations of G. Brownlee Quart. J. Pharm., Vol. 10, page 609, 1937 and Quart. J. Pharm., Vol. 12, page 45, 1939). The drugs under test are administered intraperitoneally and the response is compared to that of saline controls. The average change in temperature over a period of three hours following the administration of aminopyrine (100 mg./kg., i.p.), AMR–69 (100 mg./kg., i.p.) and the saline (isotonic) controls were as follows:

```
                                              ° C.
Saline Controls_____  +0.9±0.17
Aminopyrine (standard)_____  −0.6±0.16
AMR–69 _____   −0.4±0.12
```

As compared to the saline control, the reduction in fever was highly significant for aminopyrine ($t=6.6$, $p<0.01$) and for AMR–69 ($t=6.3$, $p<0.01$). AMR–69 is effective anti-pyretic agent.

Acute Toxicity in Mice

In fasted albino mice (Flanders) the $LD_{50}$ for AMR–69 and aminopyrine was determined by standard procedures with the following results:

|  | Oral $LD_{50}$, mg./kg. | Intraperitoneally $LD_{50}$, mg./kg. |
| --- | --- | --- |
| AMR–69 | 580±79 | 420±9 |
| Aminopyrine | 475±63 | 175±9 |

It is apparent that AMR–69 has a significant higher lethal dosage level as compared to aminopyrine and particularly this level is much higher with respect to routes for rapid administration.

Blood Studies

In series of test animals including rats, mice, rabbits and dogs, blood studies after administration of AMR–69 for efficacy, and acute and chronic toxicity have shown no indication of blood dyscrasias due to the administration of this agent in therapeutic or sublethal amounts. In lethal amounts the toxic effects observed were other than those caused by blood dyscrasias and this was borne out by blood and organ studies. This is in contrast to aminopyrine.

Example 1.—5-Methyl-1-phenyl-2-(1H) pyridone

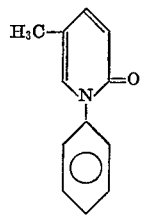

A finely pulverized mixture containing 21.8 g. of 5-methyl-2-(1H) pyridone (J. V. Scudi et al. U.S. Pat. 2,947,755), 30.4 g. of anhydrous potassium carbonate, 0.25 g. of zinc precipitated copper powder and 40 ml. of iodobenzene is stirred mechanically and refluxed for 18 hours. The mixture is cooled and treated with 150 ml. of benzene, filtered and the filtrate is decolorized with charcoal. The decolorized benzene filtrate is then evaporated to an oil which on trituration with petroleum ether and cooling gives 31.9 g. (85%) of the product as a brown solid, m.p. 90–104°. It is crystallized from hot water to yield a white solid melting at 102–104°.

Example 2.—5-Methyl-1-(3-nitrophenyl-2)-(1H) pyridone

The reaction of 24.9 g. of 1-iodo-3-nitrobenzene (Aldrich Chemical Co.) with 10.9 of 5-methyl-2-(1H) pyridone by the procedure described in example 1 affords 16.2 g. (75%) of 5-methyl-1-(3 nitrophenyl) pyridone.

Example 3.—5-Methyl-1-(4′-methoxyphenyl)-2-(1H) pyridone

When p-methoxyiodobenzene is substituted for iodobenzene in the procedure of Example 1, 5-Methyl-1-(4′-methoxyphenyl)-2-(1H) pyridone as a crystalline white product is obtained in 78% yield.

Example 4.—5-Methyl-1-p-tolyl-2-(1H) pyridone

The reaction of p-iodotoluene with 5-methyl-2-(1H) pyridone by the procedure of example 1, affords 5-Methyl-1-p-tolyl-2-(1H) pyridone in 89% yield.

Example 5.—5-Methyl-1-(3′-trifluoromethylphenyl)-2-(1H) pyridone

The reaction of 5-methyl-2-(1H) pyridone with -3-trifluoromethyl-iodobenzene by the procedure of example 1, gives a 78% yield of 5-Methyl-1-(3′-trifluoromethylphenyl)-2-(1H) pyridone.

Example 6.—1-(4′-Chlorophenyl)-5-methyl-2-(1H) pyridone

The reaction of 5-methyl-2-(1H) pyridone and 1-chloro-4-iodobenzene (Aldrich Chemical Company) in the procedure of example 1 yields 1-(4′-Chlorophenyl)-5-methyl-2-(1H) pyridone as a white crystalline solid in 75% yield.

Example 7.—5-Methyl-1-(2′-naphthyl)-2-(1H) pyridone

Following substantially the procedure of example 1, B-iodonaphthalene is reacted with 5methyl-2-(1H) pyridone to give 5-Methyl-1-(2′-naphthyl)-2-(1H) pyridone in 74% yield.

Example 8.—5-Methyl-1-(1′-naphthyl)-2-(1H) pyridone

5-Methyl-1-(1-naphthyl)-2-(1H) pyridone is prepared by the reaction of 5-methyl-2-(1H) pyridone and α-iodonaphthalene following the procedure of example 1 but substituting anhydrous sodium carbonate for the potassium carbonate; yield 68%.

Example 9.—3-Methyl-1-phenyl-2-(1H) pyridone

A mixture of 10.9 g. of 3-methyl-2-(1H) pyridone and 20 ml. of iodobenzene when caused to react under the conditions as decribed in example 1, yields 17.2 g. of (93%) 3-methyl-1-phenyl-2-(1H) pyridone.

Example 10.—6-Methyl-1-phenyl-2-(1H) pyridone

The condensation of 10.9 g. of 6-methyl-2-(1H) pyridone (Adams and Schrecker, J.A.C.S. 71 (1949)) with 20 ml. of iodobenzene under the reaction conditions as in example 1 affords 18.7 g. (79%) of 6-methyl-1-phenyl-2-(1H) pyridone, [M. Shamma and P. D. Rosenstock, J. Org. Chem. 26, 2586 (1961)].

Example 11.—3,6-Dimethyl-1-phenyl-2-(1H) pyridone

As described in example 1, 12.3 g. of 2,6-dimethyl-2-(1H) pyridone is reacted with 20 ml. of iodobenzene to yield 16.1 g. (81%) of 3,6-dimethyl-1-phenyl-2(1H) pyridone.

Example 12.—5-Methyl-1(2′-Thienyl)-2(1H) pyridone

Following the method essentially of example 1, 2-bromothiophene is reacted with 5-methyl-2(1H) pyridone to give 5-Methyl-1(2′-Thienyl)-2(1H) pyridone; yield 82%.

Example 13.—1-(2′-Furyl)-5-methyl-2-(1H) pyridone

In the manner described in example 1; 2-bromofuran and 5-methyl-2(1H) pyridone are reacted to provide 1-(2′-Furyl)-5-methyl-2(1H) pyridone; yield 63% m.p.

Example 14.—5-Methyl-1-(5′-quinolyl)-2-(1-H) pyridone 5-iodoquinoline reacts with 5-methyl-2-(1-H) pyridone as described in example 1, and affords 5-Methyl-1-(5′-quinolyl)-2-(1-H) pyridone in 85% yield.

Example 15.—5-Methyl-1-(4′-pyridyl)-2(1H) pyridone

5-Methyl-1-(4′-pyridyl)-2(1H) pyridone is obtained in 74% yield when 4-bromopyridone is substituted for iodobenzene in example 1.

Example 16.—5-Methyl-1-(3'-pyridyl)-2-(1H)pyridone

3-Bromopyridine is substituted for iodobenzene in the procedure of example 1 to give 5-methyl-1-(3'-pyridyl)-2-(1H) pyridone in 71% yield.

Example 17.—5-Methyl-1-(2'-pyridyl)-2-(1H) pyridone

Following the general procedure outlined in example 1, 2-bromopyridine is caused to react with 5-methyl-2-(1H) pyridone to yield 83% of 5-Methyl-1-(2'-pyridyl)-2-(1H) pyridone.

Example 18.—5-Methyl-1-(2'-quinolyl)-2-(1H) pyridone

The preparation of 5-Methyl-1-(2'-quinolyl)-2-(1H) pyridone is carried out as in example 1 using 5-methyl-2-(1H) pyridone and 2-bromoquinoline; yield 71%.

Example 19.—5-Methyl-1-(4'-quinolyl)-2-1(H) pyridone

5-Methyl-2-(1H) pyridone is condensed with 4-bromoquinoline as described in example 1 to afford 5-Methyl-1-(4'-quinolyl)-2-(1H) pyridone in 65% yield.

Example 20.—5-Methyl-1-(2'-thiazolyl)-2-(1H) pyridone

5-Methyl-1-(2'-thiazolyl)-2-(1H) pyridone is obtained by the reaction of 2-chlorothiazole with 5-methyl-2-(1H) pyridone following the general method of example 1; yield 69%.

Example 21.—1-(2'-Imidazolyl)-5-Methyl-2-(1H) pyridone

Following essentially the general procedure outlined in example 1, the reaction of 5-methyl-2-(1H) pyridone with 2-chloroimidazole affords 1-(2' - Imidazolyl)-5-Methyl-2-(1H) pyridone in 82% yield.

Example 22.—5-Ethyl-1-phenyl-2-(1H) pyridone

Iodobenzene when caused to react with 5-ethyl-2-(1H) pyridone following the general procedure outlined in example 1, a 84% yield of 5-Ethyl-1-phenyl-2-(1H) pyridone is obtained.

Example 23.—1-Phenyl-2-(1H) pyridone

Following substantially the procedure of example 1, 2-(1H) pyridone is condensed with iodobenzene to give the 1-Phenyl-2-(1H) pyridone in 82% yield as a crystalline white product.

Example 24.—1-(4'-Nitrophenyl)-2-(1H) pyridone

The reaction of 24.9 g. of 1-iodo-4-nitro-benzene (Aldrich Chemical Co.) with 9.5 g. of 2-(1H) pyridone in presence of 0.1 g. of copper powder by the procedure described in example 1 affords 17.3 g. (80%) of 1-(4-nitrophenyl)-2-(1H) pyridone.

Example 25.—1,3-Diphenyl-2-(1H) pyridone 1,3-Diphenyl-2-(1H) pyridone is obtained in 80% yield by causing 3-phenyl-2-(1H) pyridone (Brit. Pat. 1,238,959; B. E. Witzel) to react with iodobenzene as described in example 1.

Example 26.—1-Phenyl-3-(4'-chlorophenyl)-2-(1H) pyridone

1-Phenyl-3-(4' - chlorophenyl)-2-(1H) pyridone is realized in 78% yield by the reaction of 3-(p-chlorophenyl)-2-(1H) pyridone (Bruce E. Witzel, Brit. Pat. 1,238,959) with iodobenzene described in example 1.

Example 27.—1,3-Diphenyl-5-methyl-2-(1H) pyridone

5-Methyl-3-phenyl-2-(1H) pyridone (B. E. Witzel et al. Brit. Pat. 1,238,959) is reacted with iodobenzene as in example 1 to give 1,3-Diphenyl-5-methyl-2-(1H) pyridone in 77% yield.

Example 28.—3-(4'-Chlorophenyl)-5-Methyl-1-phenyl-2-(1H) pyridone 3-(4'-Chlorophenyl) - 5-Methyl-1-phenyl-2-(1H) pyridone is prepared in 82% yield by the reaction of 3-(p-chlorophenyl)-5-methyl-2-(1H) pyridone (B. E. Witzel et al. Brit. Pat. 1,238,959) with iodobenzene as described in example 1.

Example 29.—5-Methyl-3-phenyl-1-(2'-thienyl)-2 pyridone

The reaction of 2-thienyl bromide with 5-methyl-3-phenyl-2-(1H) pyridone by the procedure outlined in example 1 but substituting anhydrous lithium carbonate for the potassium carbonate provides 5-Methyl-3-phenyl-1-(2'-thienyl)-2-(1H) pyridone in 67% yield.

Example 30.—Therapeutic dosage forms of 5-methyl-1-phenyl-2-(1H) pyridone

The excipients indicated below are the excipients commonly used for making pharmaceutical tablets. Such tablets preferably have a concentration of the active constituent in the range generally between 100–500 mg. per tablet.

|  | Mg. |
|---|---|
| AMR–69 (5-methyl - 1 - phenyl-2(1H) pyridone) | 100–500 |
| Polyvinylpyrrolidone | 2–4 |
| Silicic acid | 1 |
| Corn starch | 40–80 |
| Magnesium stearate | 1–5 |
| Talc | — |
| Milk sugar | Q.s. |

The above mixture with commonly used moistening agents such as glucose syrups and water is granulated and then pressed in a tablet-making machine.

It will be understood that formulation with the active compound can be prepared in the form of pills, dragees, capsules, chachets, suppositories sustained release pulvules and similar pharmaceutical forms.

The posology of the compound in dosage form of course should be determined by a physician. The individual dose should be adpated and adjusted to the patent's reactivity, the severity of the symptoms, the age and weight and the general physical condition of the patient.

Example 31.—Therapeutic solution intended for injection

|  | Mg. |
|---|---|
| 5-methyl-1-phenyl-2(1H) pyridone | 100 |
| Sodium chloride | 2.5 |
| Buffers, distilled water [1] Q.s. ad | 10 |

[1] AMR–69/cc.

The above formulation may then be packaged into multiple dose vials or into individual ampules.

Similarly, suspensions and solutions in liquid media such as oils, syrups, tinctures and solvent solutions may be prepared. Petrolatum may be used as a vehicle for topical application.

The foregoing examples are presented to indicate the nature and utility of this invention. The specific examples constitute preferred embodiments of the practice of this invention and the results indicated set forth the true nature and utility of this invention. It is understood that these examples are presented as illustrative and they are not intended to limit in any way the scope of this invention. All art-recognized equivalents of the specific embodiments and ingredients set forth are intended.

I claim:

1. A process for the synthesis of pyridones of the formula

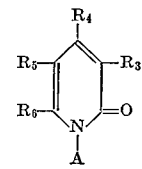

wherein A is an aromatic radical selected from the group consisting of phenyl, tolyl, chlorophenyl, trifluoromethylphenyl, naphthyl, pyridyl, furyl, thienyl, thiazolyl, pyrimidyl, quinolyl, imidazolyl; up to two of the terms $R_3$, $R_4$, $R_5$, and $R_6$ are individually each hydrogen or alkyl up to 6 carbon atoms, aryl or substituted aryl radicals which consists essentially of the steps of reacting a pyridone of the formula

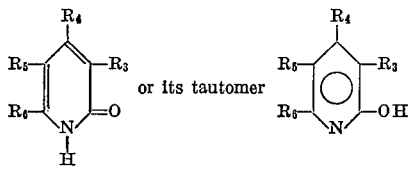

in which $R_3$, $R_4$, $R_5$ and $R_6$ are as set forth above, with a halogenated compound of the formula AX, wherein X is either chlorine, bromine or iodine, at temperatures ranging between the melting point and boiling point of said halogenated compound, in the presence of an alkali metal carbonate and finely divided metallic copper.

2. The process according to Claim 1 wherein the reaction is conducted near but below the boiling point of said halogenated compound.

3. The process according to Claim 1 wherein the alkali metal carbonate is anhydrous potassium carbonate.

4. The process according to Claim 1 wherein the finely divided copper is prepared by precipitation from $CuSO_4$ solutions by zinc dust.

5. The method according to Claim 1 wherein 5-methyl-2(1H) pyridone is reacted with iodobenzene in the presence of freshly prepared finely divided copper and potassium carbonate.

References Cited

UNITED STATES PATENTS 2,947,755   8/1960   Scudi et al. _____ 260—296 R

OTHER REFERENCES

Chem. Abstracts, vol. 48, Number 21, 748a–g, Nov. 10, 1954.

ALAN L. ROTMAN, Primary Examiner

U.S. Cl. X.R.

260—256.4 N, 287 R, 294.8 D, 296 R; 424—251, 258, 263